Printed Specification Available
6197X
A. & J. KRAUSS.
Fertilizer.
Patented Oct. 16, 1830.
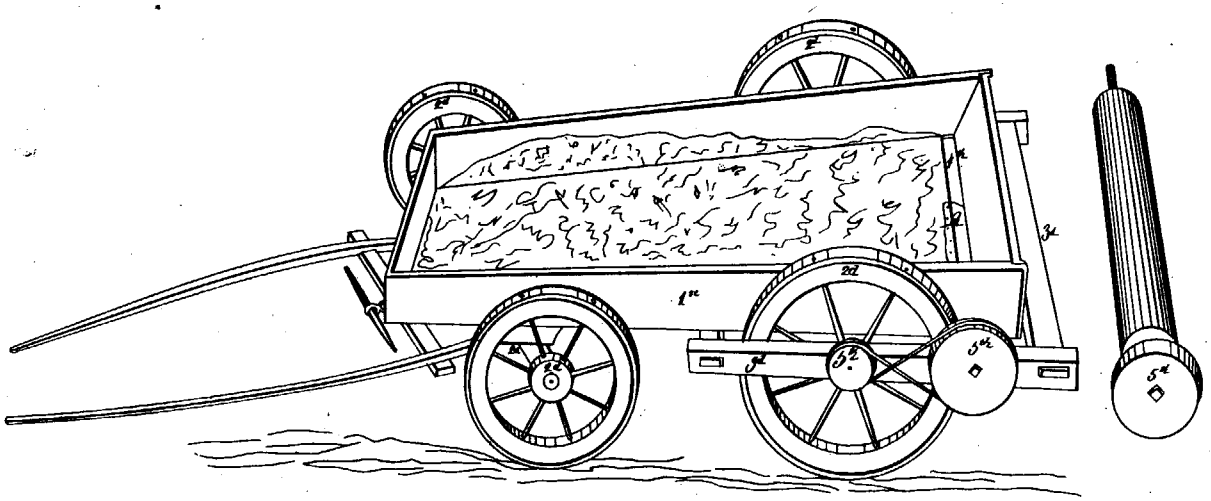
N. PETERS, PHOTO-LITHOGRAPHER, WASHINGTON, D. C.

Andrew & Joel Krauss Milford Township, Pennsylvania

The schedule referred to in these Letters Patent and making part of the same, containing a description in the words of the said Andrew Krauss & Joel Krauss, themselves of their improvement, being a Machine for spreading lime, Plaister &c, on Land.

---

Be it known that we, Andrew Krauss, and Joel Krauss of upper Milford Township, County of Leigh & State of Pennsylvania, have made an improvement, being a machine for spreading lime, plaister &c on Land & that the following is a description of the same.

This machine consists of the following principal parts viz 1st The waggon body 2d The axle trees & wheels. 3d The frame. 4th The Roller - 5th The Pulleys ——— 1st The Waggon Body is made similar to those in common use, except that its bottom does not extend the whole ~~length~~ length of the waggon body, but only as far as the upper surface of the roller, (hereafter to be described) & within about 2 inches of the bottom of the tail board, leaving a space or opening thro' which the lime &c passes, of about 2 inches; A piece of leather nearly the length of the roller, & about 1½ inch wide, is nailed to the end of the waggon bottom, & projects beyond it on the roller about ¾ of an inch. The tail board works up and down in [illegible] in the sides of the waggon body. The waggon body is wider at the hinder than at the forward end; & rests with its forward end on the front axle tree, & its hinder end on the frame hereafter to be described. Should the lime or plaister be stony, a riddle must be used to separate them. ——— 2d, The axle trees & wheels.

There are 2 axle trees & 4 wheels. The forward axle tree & wheels are loose, the wheels working on it as usual, but the wheels of the hinder axle tree, do not turn on it, but are fixed & the axle tree revolves within the frame in metal boxes placed in the side pieces thereof, On one end of this last mentioned axle tree, & on the outside of the frame is a pulley. ———

2 X61[illegible]

3rd. The frame is made by framing together two side & 2 end pieces by mortises & tenons forming a frame a little more than half the length of the waggon, & a few inches wider than the width of the waggon body. It is placed under the waggon body at the hinder end, and contains the hinder wheels & roller, as before mentioned, & is attached to the forward axletree by a connecting piece of timber with iron bolts.

4th. The Roller is in length equal to the width of the frame within which it revolves, & about 8 inches diameter. It turns on gudgeons in metal boxes in the side pieces of the frame. One of the gudgeons projects beyond the outer side of the frame on which is a pulley. The roller is placed near the hinder end of the frame, with its upper surface directly below the opening for the passage of the lime &c & almost touching the end of the bottom of the waggon. It is by the revolving of this roller that the operation of spreading the lime &c is performed.

5th. The Pulleys are two in number & are placed one on the end of the hinder axle tree, and the other on the end of the gudgeon of the roller as before mentioned. The pulley on the axle tree is [illegible] inches in diameter; the other on the roller is 15 inches in diameter; Around both passes a cord or chain which is crossed. Instead of this gearing, Cog wheels may be substituted ——————

Operation

The horses or other animals being attached to the manuring waggon in any convenient manner & the waggon filled with lime or plaister, & drawn forward, causes the wheels, pulley & roller to revolve the roller being in contact with the lime or plaister, draws it gradually from the waggon & spreads it evenly over the surface of the earth as the waggon advances. What we claim as our invention and which we wish to secure by Letters Patent is the machine, as above described, for spreading lime, plaister &c, on Land. Further to illustrate our invention we refer to the model & drawing of the same, deposited in the patent office.

In testimony whereof we have hereunto signed our names before two witnesses [illegible] to the Sworn this twenty first day of September A.D. 1830.

Witness

Jonathan Shoemaker — Andrew Kreuff — Exd.

John A. Shoemaker — Joel Kreuff — Ntb.

(868 words)

Patented October 16. 1830.